Figure 1:
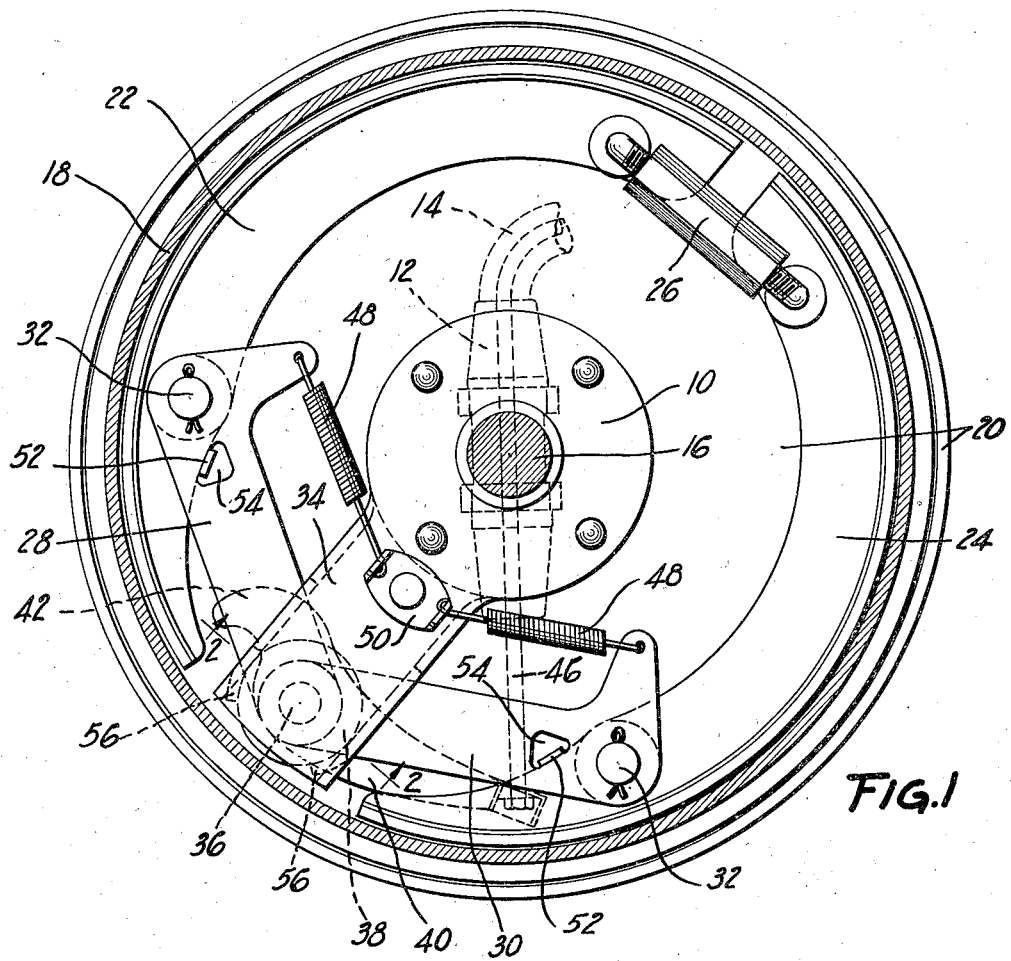

Nov. 26, 1935.  W. J. ANDRES  2,022,023

BRAKE

Filed Oct. 21, 1933

INVENTOR.
WILLIAM J. ANDRES
BY
ATTORNEY

Patented Nov. 26, 1935

2,022,023

UNITED STATES PATENT OFFICE 2,022,023

BRAKE

William J. Andres, South Bend, Ind., assignor to Bendix Aviation Corporation, South Bend, Ind., a corporation of Delaware Application October 21, 1933, Serial No. 694,543

11 Claims. (Cl. 188—78)

This invention relates to brakes, and is illustrated as embodied in an internal expanding automobile brake. An object of the invention is to provide improved simple and effective applying and anchoring means for the brake.

In one arrangement, the brake is applied by a toggle or the like connected to the ends of the friction means, and having a guide for a roller or other part which is shown extending radially of the brake, and which preferably also takes the braking torque and therefore serves as the brake anchor.

In the arrangement shown in the drawing, the knuckle carries a support which is provided with a radial guideway for a roller on the knee of the above-described toggle. The knee of the toggle also has pivoted thereon, in the arrangement illustrated, an operating lever which may be actuated by means such as a cable extending through a hollow kingpin on which the knuckle is swiveled.

Since the torque is transmitted to the radial guide by the roller or its equivalent, in effect the brake anchor is moved inward radially the harder the brake is applied, thereby intensifying its self-energizing action.

Figure 2:
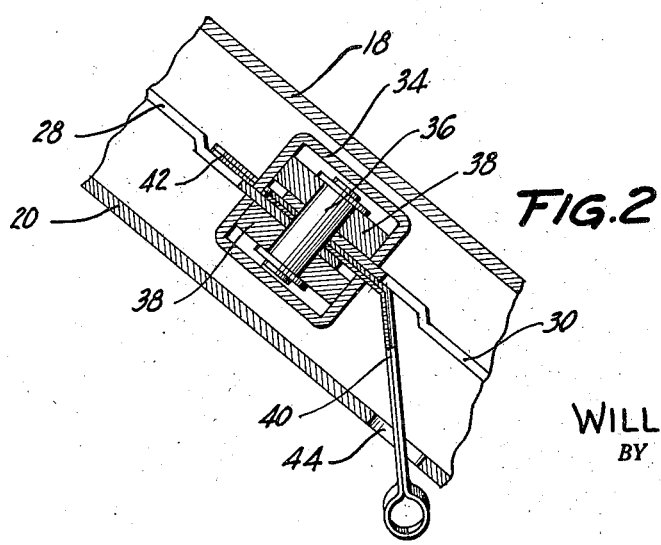

The above and other objects and features of the invention, including various novel combinations of parts and desirable particular constructions, will be apparent from the following description of the illustrative embodiment shown in the accompanying drawing, in which:

Figure 1 is a vertical section through the brake, just inside the head of the brake drum, and showing the brake shoes in side elevation; and Figure 2 is a partial section on the line 2—2 of Figure 1, showing the roller of the applying means in its radial guide.

In the illustrated arrangement, a front knuckle 10 is swiveled at the end of its axle by a hollow kingpin or the like 12, to the upper end of which is connected the end of a flexible conduit 14 forming part of a Bowden-type control.

The knuckle 10 carries (on its spindle 16) the usual wheel (not shown) with its rotatable drum 18, and has secured thereto at the open side of the drum a cover such as a backing plate 20. Within the drum are arranged a pair of brake shoes 22 and 24, shown connected by a novel adjustable joint 26 more fully described, and claimed, in my copending application No. 581,455, filed December 16, 1931, of which the present application is a partial continuation.

The lower ends of the shoes are connected by novel applying and anchoring means shown as including a toggle comprising links 28 and 30, in the shape of right-angle bellcrank levers connected to the shoes respectively by pivots 32. The free ends of these levers extend through slots in the sides of a rectangular-section tubular radially-extending guide or housing 34, which may be integral with or fixedly secured to the knuckle 10, and which may be regarded as the brake anchorage. The links are connected inside the tubular guide by means such as a floating pivot pin 36.

The pin 36 also carries guide rollers 38 rolling radially inside the guide 34 and transmitting the anchorage torque from shoes 22 and 24 thereto, and forming in effect thrust-transmitting radially-shiftable anchorage members. The pin 36 may be regarded as the knee of the toggle 28—30.

The pin 36 also serves as a support for a novel operating lever 40, which is pivoted thereon. This lever has a hook or cam end 42 which extends through a slot in the side wall of the tubular guide or anchor 34, and which fulcrums on the wall of that slot when force is applied upwardly on its right-hand end.

The right-hand end of the lever 40 extends through a slot in the side of the guide 34, and through an opening 44 in the backing plate 20 if necessary to bring the end of the lever in line with the hollow kingpin 12.

The end of the lever is connected to a cable or the like 46 passing through the hollow kingpin 12, and which passes through the flexible conduit 14 and forms part of the Bowden control by which the brake is applied.

The shorter ends of the bellcranks 28 and 30 are connected to return springs 48 tensioned between the levers and a clip 50 fastened to the guide 34. The backing plate may be provided with suitable positioning stops 52, passing through openings 54 in the links 28 and 30 and engaged by the edges of those openings when the brake is released, to position the links, and also engaged by the edges of the webs of shoes 22 and 24 when the brake is released, to position the shoes.

Fingers 56 are bent inwardly from the sides of the guide 34, to embrace and position the rollers 38 when the brake is released.

While one illustrative embodiment has been described in detail, it is not my intention to limit the scope of the invention to that particular embodiment, or otherwise than by the terms of the appended claims.

I claim:

1. A brake comprising a friction element having separable ends, a toggle connected between the separable ends, a roller on the knee of the toggle and a guide for the roller.

2. A brake comprising a friction element having separable ends, a radially movable anchor-engaging part therefor, an anchorage having a radial guide movably receiving said part, a toggle having its respective legs pivoted to the respective separable ends of the friction element and its knee pivoted to the movable anchor-engaging part, and means for spreading the toggle.

3. A brake comprising a fixed support, a drum associated therewith, a friction element cooperating with the drum having separable ends, a movable anchor-engaging part therefor, means for moving said part including means for actuating the friction element.

4. A brake comprising a friction element having separable ends, a toggle having corresponding legs pivotally connected between the separable ends of the toggle, rollers on opposite sides of the knee on the pivot thereof, and an operating lever on the pivot pin of the knee.

5. A brake comprising a fixed support, a torque-taking arm on the support, a friction element having separable ends, a toggle connected between the separable ends, a guide on the arm for the knee of the toggle, and an operating lever pivoted on the knee and fulcrumed on the guide.

6. A brake comprising a friction element having separable ends, a fixed support, a torque-taking arm on the support extending between the separable ends, a rectangular housing on the torque-taking arm, a toggle connected between the separable ends having its knee positioned within the housing, rollers on opposite sides of the knee adapted to travel on the inner wall of the housing, and an operating lever pivoted on the knee of the toggle having its fulcrum on the wall of the housing.

7. A brake comprising a friction element having separable ends, a fixed support, a torque-taking arm on the support extending between the separable ends, a rectangular housing on the arm, a toggle connected between the separable ends having its knee positioned within the housing, rollers on opposite sides of the knee positioned for rotation on the knee and adapted for travel on the inner wall of the housing, an operating lever fulcrumed on the knee having its fulcrumed end in the wall of the housing and tension members connecting the legs of the toggle to the arm.

8. A brake comprising a friction element having separable ends, a fixed support, a torque arm on the fixed support extending between the separable ends, a rectangular housing on the arm, a toggle connected between the arms including bellcrank levers pivotally connected between the separable ends of the friction element and having its knee positioned within the housing, rollers on the knee engaging the inner wall of the housing, an operating lever pivoted on the knee and engaging the wall of the housing and tension members connecting the other ends of the bellcrank levers to the torque arm.

9. A brake comprising a friction element having separable ends, a drum adaptable for co-operation therewith, a fixed support, a radial torque-taking arm on the fixed support, a rectangular housing on the arm, a toggle connected between the separable ends of the friction element having its knee positioned in the housing, lateral arms on the ends of the toggle, tension members connecting the lateral arms to the torque-taking arms, rollers on the knee of the toggle adaptable for travel on the inner wall of the housing, an operating lever pivoted on the knee of the toggle and fulcrumed on the wall of the housing and a cable connected to the force-appplying end of the lever and extending through the pivot pin.

10. A brake having applying means including a roller, a guide for said roller extending radially of the brake, and means at the outer end of the guide serving as a stop for the roller.

11. A guide for a brake-applying device comprising a hollow arm having inturned stop portions at its outer end.

WILLIAM J. ANDRES.

CERTIFICATE OF CORRECTION.

Patent No. 2,022,023.  November 26, 1935.

WILLIAM J. ANDRES.

It is hereby certified that error appears in the printed specification of the above numbered patent requiring correction as follows: Page 2, first column, line 14, claim 3, after the comma and before "means" insert the words an anchorage having a radial guide movably receiving said part; and that the said Letters Patent should be read with this correction therein that the same may conform to the record of the case in the Patent Office.

Signed and sealed this 8th day of September, A. D. 1936.

Leslie Frazer

Acting Commissioner of Patents.

(Seal)